US012582041B2

(12) United States Patent
Beelaert et al.

(10) Patent No.: US 12,582,041 B2
(45) Date of Patent: Mar. 24, 2026

(54) FORAGE HARVESTER EQUIPPED WITH A CROP PICK-UP HEADER

(71) Applicant: CNH Industrial America LLC, New Holland, PA (US)

(72) Inventors: Simon Beelaert, Adegem (BE); Jeffrey Blancke, Markegem (BE); Stijn Van Belleghem, Maldegem (BE); Pieter Willems, Maldegem (BE)

(73) Assignee: CNH Industrial America LLC, New Holland, PA (US)

( * ) Notice: Subject to any disclaimer, the term of this patent is extended or adjusted under 35 U.S.C. 154(b) by 421 days.

(21) Appl. No.: 18/284,817

(22) PCT Filed: Mar. 30, 2022

(86) PCT No.: PCT/EP2022/058478
§ 371 (c)(1),
(2) Date: Sep. 28, 2023

(87) PCT Pub. No.: WO2022/207744
PCT Pub. Date: Oct. 6, 2022

(65) Prior Publication Data
US 2024/0373786 A1 Nov. 14, 2024

(30) Foreign Application Priority Data
Mar. 31, 2021 (EP) .................................... 21166393

(51) Int. Cl.
*A01D 43/08* (2006.01)
*A01D 41/14* (2006.01)
*A01D 57/04* (2006.01)

(52) U.S. Cl.
CPC ......... *A01D 43/086* (2013.01); *A01D 41/141* (2013.01); *A01D 43/085* (2013.01); *A01D 57/04* (2013.01)

(58) Field of Classification Search
CPC .. A01D 43/086; A01D 41/141; A01D 43/085; A01D 57/04
See application file for complete search history.

(56) References Cited

U.S. PATENT DOCUMENTS 6,651,412 B1 * 11/2003 Sierk .................... A01D 75/182
56/11.2
9,936,642 B2 * 4/2018 Depestel .............. A01D 89/004

FOREIGN PATENT DOCUMENTS

CN 205266321 U 6/2016
EP 1038431 A2 * 9/2000 ........... A01F 15/106
(Continued)

OTHER PUBLICATIONS

Extended European Search Report for European Application No. 21166393.5, dated Oct. 7, 2021—4 pages.
(Continued)

*Primary Examiner* — Kenneth M Dunne
(74) *Attorney, Agent, or Firm* — CM Law PLLC; Stephen J. Weed

(57) ABSTRACT

In a harvester/header combination according to the invention, the header is a crop pick-up header (2) coupled to a forage harvester (1). The header comprises a frame (10) and a rotatable reel (13) configured to collect crops from the ground, a rotatable auger (20) provided with two oppositely wound helicoidal flights (26), and one or more windguard rolls (15). The auger is rotatable with respect to a pair of support arms (21) which are themselves pivotable relative to the frame, so that the pivoting movement of the arms results in lowering or raising the auger (20). According to the invention, the header comprises at least one set of actuators (18, 19) capable of actively raising the auger and the windguard roll(s) and the harvester/header combination comprises a control unit (46) configured to execute a sequence of steps for removing a foreign object from the (Continued)

header, after detection of the object and stoppage of the harvester's feed rolls (51). The removal sequence includes raising the auger while rotating the auger in the reverse direction, followed by lowering the auger while maintaining said reverse rotation.

18 Claims, 4 Drawing Sheets

(56)                References Cited

FOREIGN PATENT DOCUMENTS

| | | |
|---|---|---|
| JP | 2018011565 A | 1/2018 |
| WO | 2016176587 A1 | 11/2016 |
| WO | 2018122744 A1 | 7/2018 |

OTHER PUBLICATIONS

International Search Report and Written Opinion for International Application No. PCT/EP2022/058478, dated Jul. 27, 2022 (Jul. 27, 2022)—10 pages.

\* cited by examiner

FORAGE HARVESTER EQUIPPED WITH A CROP PICK-UP HEADER

FIELD OF THE INVENTION

The present invention is related to the use of a crop pick-up header mounted at the front of a forage harvester.

STATE OF THE ART

Pick-up headers are used for example for collecting grass that has been previously cut and left to dry on a field in the form of elongate swaths. A self-propelled forage harvester is fitted with the pick-up header at its front, and driven along the swaths. The header picks up and collects the grass, and delivers it to the inlet of the forage harvester, where it is taken in by a set of feed rolls, followed by a chopper drum, which chops up the grass stalks into smaller portions. The chopper drum rotates at a constant rotational speed, whereas the speed of the feed rolls can be adapted as a function of the desired length of cut (LOC), i.e. the length of the chopped portions, which may vary for example from about 4-5 mm to about 45 mm.

A crop pick-up header, e.g. a grass pickup unit, as presently known in the art generally comprises an intake reel that picks up and delivers them to a rotating auger equipped with two oppositely oriented auger flights. The crops are thereby transported to a central area of the header from where they are transferred to the feed rolls of the harvester. The auger as a whole may be mounted so as to be able to pivot about a hinge axis and during crop collection, the rotating auger rests on a mat of the incoming crops, so that it may be pivoted upward and downward as a function of the amount of crop that is being gathered by the reel.

In patent publication document WO2015/091567, a harvester/pick-up header combination is described, that is configured to enable a sequence of actions for the removal of foreign objects such as stones or pieces of metal from the header. When such objects are detected, for example by a metal detector mounted close to the feed rolls of the harvester, the feed rolls are stopped and the removal sequence is initiated. The sequence includes driving the feed rolls of the harvester and the auger of the pick-up header in the reverse direction while the reel is freely rotatable, and after some time actuating the reel actively and also in the reverse direction, to thereby remove crops that have accumulated in the header at the time of stopping the feed rolls, as well as removing the foreign object. A problem with this approach is that the crops may not be effectively removed due to a lack of space underneath the auger, which increases the risk of the foreign object remaining stuck in the header and causing repeated interruptions of a harvesting run. In some header types it is possible to actively raise the auger, but this capability has not been effectively applied in a method for the removal of a foreign object.

SUMMARY OF THE INVENTION

The invention is related to harvester/header combination, in particular to a forage harvester equipped with a crop pick-up header and provided with a control unit configured to enable an object removal sequence, as described in the appended claims. The invention is equally related to a method for removing a foreign object from the header, as described in the appended claims.

In a harvester/header combination according to the invention, the crop pick-up header comprises a number of components which are known from prior art headers, such as a frame and a rotatable reel configured to collect crops from the ground, a rotatable auger provided with two oppositely wound helicoidal flights, and one or more windguard rolls. The auger is rotatable about its central axis with respect to a pair of support arms which are themselves pivotable relative to the frame, so that the pivoting movement of the arms results in lowering or raising the auger with respect to the floor of the header frame. According to the invention, the header comprises at least one set of actuators capable of actively raising the auger and the windguard roll(s). The harvester/header combination further comprises a control unit configured to execute a sequence of steps for removing a foreign object from the header, after detection of the object and stoppage of the harvester's feed rolls. The removal sequence includes raising the auger while rotating the auger in the reverse direction, followed by lowering the auger while maintaining said reverse rotation. The invention is effective in removing the foreign object due to the specific sequence of steps which further include first decoupling the reel and at the end of the sequence, actively driving the reel in the reverse direction.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1:
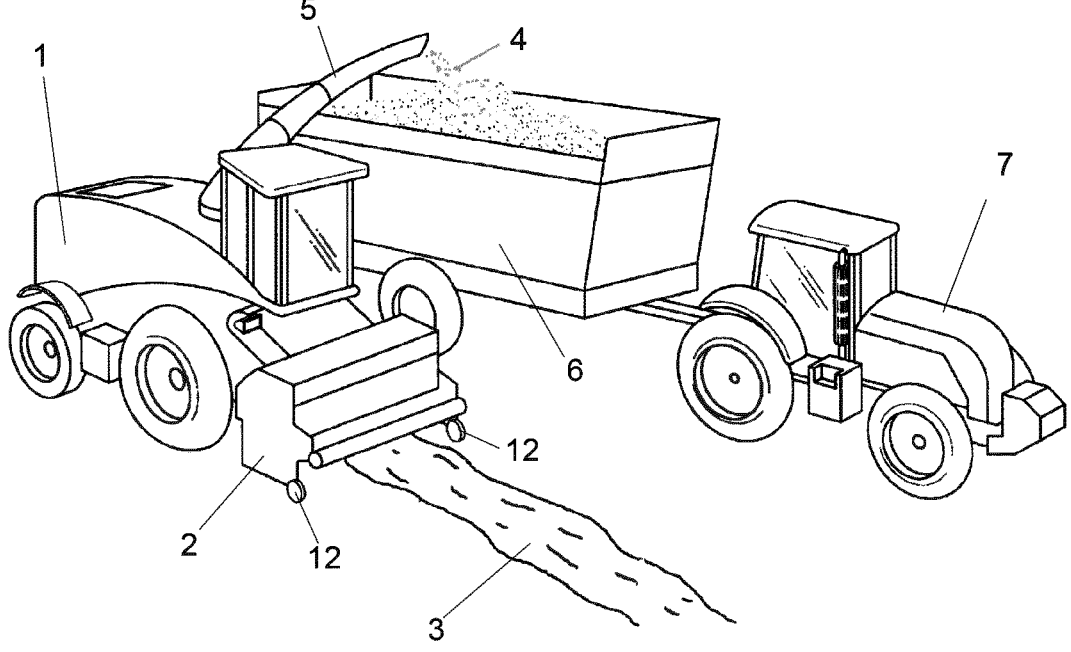
FIG. 1 illustrates a typical harvesting situation wherein a grass pick-up header is attached to a forage harvester.

FIG. 1 illustrates a self-propelled forage harvester 1 that is collecting and processing grass from a field through a pick-up header 2 mounted at the front of the harvester and not shown in much detail in the drawing, apart from the front support wheels 12 of the header and a windguard roll 15 (to be shown in more detail in FIGS. 2 and 3). Grass swathes 3 are lying along parallel trajectories on the field, having been cut previously, and the harvester driver follows these trajectories to collect and process the grass into chopped stems or particles. A stream 4 of processed grass is ejected from the spout 5 of the harvester and discharged into a trailer 6 towed by a tractor 7 that is driven alongside the harvester 1.

Figure 2A:
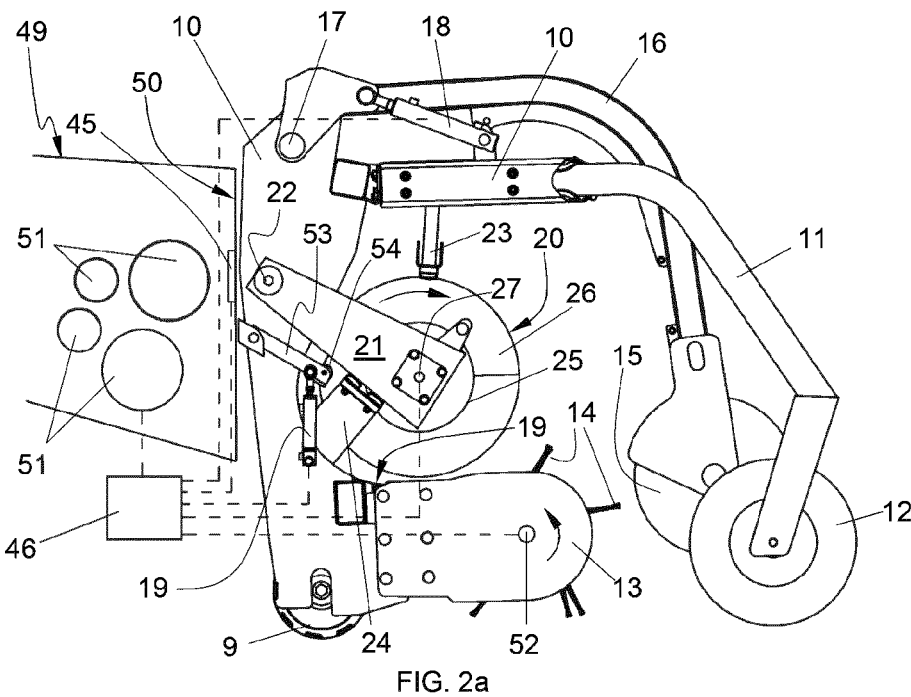
FIGS. 2a and 2b show side views of a pick-up header in a harvester/header combination according to a first embodiment of the invention, wherein the auger is provided with a dedicated actuator for actively raising and lowering the auger.
Figure 2B:
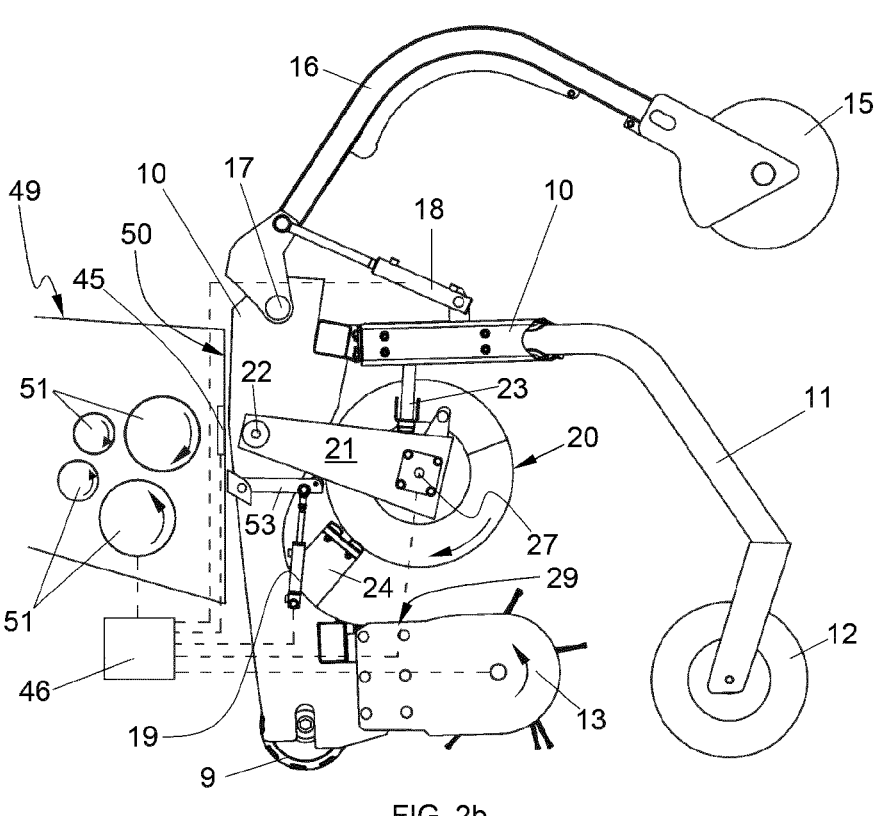

A crop pick-up header 2 applicable in a harvester/header combination in accordance with a first embodiment of the invention is shown in a little more detail in a side view in FIGS. 2a and 2b. The drawings are still simplified with respect to an actual header, as they intend to show only the main components in order to explain the present invention. The header 2 comprises a frame 10. The frame 10 is equipped with a coupling structure (not shown) that is to be attached to the harvester 1, and that includes a coupling for a drive axle as well as hydraulic and/or electrical connections. This type of coupling structure is well-known in the art and therefore not shown in the drawings. The feeder 49 of the harvester, including the feeder's inlet section 50 and the feed rolls 51 is shown in a simplified way, in order to illustrate the approximate position of the feed rolls 51 relative to the header 2. Arrows illustrate the forward rotational direction of the feed rolls 51, i.e. the rotational direction applied during normal crop collection.

The feed rolls 51 are configured to be able to rotate in the reverse rotational direction as well as in the forward rotational direction. In addition, the feed rolls 51 are coupled to a control mechanism that stops the forward rotation of the rolls 51 when a foreign object enters the inlet section 50 of the harvester. This may be detected by a metal detector mounted in the vicinity of the feed rolls 51, and/or by a mechanism that detects when a hard object such as a stone or rock enters between the front feed rolls and pushes these rolls away from each other. These detection systems are known as such in the art and need therefore not be described in detail here. As also well known in the art, the control mechanism is configured to stop the rotation of the feed rolls in a very short time, for example less than 0.5 s. After this, the rotation of the feed rolls 51 may be reversed, to thereby eject the object back towards the header 2.

The above-described detection system is symbolized in FIG. 2*a* by a detector 45, which may represent a metal detector or other foreign object detection means, and a control unit 46, or at least a portion of said control unit 46, the latter having additional functions which will be described further in this description. Dotted lines symbolize the fact that detection signals or control signals are exchanged between the control unit 46 and the detector 45 or the feed rolls 51. Control signals sent to the feed rolls 51 are in reality sent to a speed drive (not shown but well-known in the art) configured to drive, stop or reverse the rotation of the feed rolls. As stated, these controls as such are known in the art. The control unit 46 may be an electronic control unit having functionalities which are known in presently applied harvesters. However, in a harvester-header combination according to the invention, the control unit 46 is configured to perform additional functions, i.e. in addition to the known functionalities, as will be explained in more detail further in this description. However before going into such detail, the relevant components of the header 2 will now be further described.

The pick-up header 2 comprises two lateral arms 11 (only one is visible in the side view) attached to the header frame 10 and coupled respectively at their ends to two front support wheels 12. At the front of the header frame 10, a reel 13 extends in the direction perpendicular to the plane of the drawing. The forward rotation of the reel 13 about its central rotation axis 52, as applied during harvesting, is indicated by an arrow. The reel is provided with tines 14 which pick the crops up from the ground and move them upwards. At the back, the frame 10 comprises a set of wheels 9 which do not touch the ground when the header is attached to a harvester and in the process of collecting crops. In operation, the header is supported only by the front wheels 12. The back wheels 9 serve as a protection for the tines 14 when sudden depressions appear in the terrain.

The reel 13 is coupled to a speed drive (not shown), that is capable of actively driving the rotation of the reel in the forward direction and in the reverse direction. The reel 13 may also be decoupled from the speed drive, so that the reel is in a freely rotatable state. The control of the forward and reverse rotation of the reel 13 and of decoupling the reel 13 from its speed drive is performed by the control unit 46, as symbolized by the dotted line between said control unit 46 and the reel 13 in FIG. 2*a*.

A windguard roll 15 is rotatably coupled between the ends of two windguard support arms 16 (only one of these is visible in the side view) which are themselves pivotably coupled to the header frame 10, at pivot axis 17. The two windguard support arms 16 are located inside the lateral support arms 11 (i.e. closer to the central vertical plane oriented in the longitudinal direction of the harvester-header combination) and can be actively pivoted about pivot axis 17 by two respective actuators 18. When the windguard roll 15 is in the low position illustrated in FIG. 2*a*, the roll 15 maintains crops that have been gathered by the reel 13, on a path towards the auger 20. The windguard rolls 15 can rotate passively, i.e. under the influence of crops passing between the reel 13 and the windguard rolls 15. The raising and lowering of the windguard roll 15 is controlled by the control unit 46, as symbolized by the dotted line connected the control unit 46 and one of the actuators 18 in FIG. 2*a*. The scope of the invention is not limited to the windguard system shown in the drawings. Other applicable systems comprise two or more windguard rolls which may be pivotable one with respect to the other, and which are rotatable with respect to a windguard frame that is itself pivotable upwards or downwards through actuators having the same functionality as the actuators 18 in the depicted system.

Returning to FIG. 2*a*, the auger 20 is mounted above the reel 13 and above a floor portion 29 of the header frame 10, between the ends of a pair of support arms 21 (only is visible in the side view), which are pivotable relative to the header frame 10 about a common pivot axis 22, that is essentially parallel to the central rotation axis 27 of the auger 20, so that pivoting the arms 21 results in raising or lowering the auger 20 relative to the floor portion 29. The range of the pivoting motion of the arms 21 is limited by stops 23 and 24 fixed to the header frame 10. FIG. 2*a* shows the auger 20 in the lowermost position, wherein the auger support arms 21 are lying against the lower stops 24. As well-known in the art, the auger 20 comprises a central tube 25 onto which two helicoidal flights 26 are fixed, one on either side of the central vertical plane of the auger 20. The flights 26 are oppositely oriented, so that crops which are transferred by the reel 13 to the auger 20 are transported towards the middle area of the header, from where they are moved into the inlet section 50 and taken in by the feed rolls 51 of the harvester. The forward rotation direction applied to the auger 20 during normal harvesting is indicated by an arrow. The auger 20 is coupled to a speed drive (not shown), that is capable of actively driving the rotation of the auger 20 in the forward direction and in the reverse direction. The control of the forward and reverse rotation of the auger 20 is performed by the control unit 46, as symbolized by the dotted line between said control unit 46 and the auger's central axis 27 in FIG. 2*a*.

In the embodiment shown in FIG. 2*a*, the header 2 comprises actuators 19 configured to actively pivot the support arms 21 about the pivot axis 22 and thereby raise or lower the auger 20 relative to the floor portion 29 of the header frame 10. The actuators 19 are configured to push against respective pivotable brackets 53 provided with a roller 54 at their end. The operation of the actuators 19 is controlled by the control unit 46, as symbolized by the dotted line between the control unit 46 and one of the actuators 19 in FIG. 2*a*.

The actuators 18 and 19 can be any known type of actuator, for example they can be hydraulic or electric variable length actuators. The speed drives of the reel 13 and of the auger 20 may be realised in accordance with known technology. They may include hydraulic or electric motors and gear or belt transmissions as known in the art. The speed drive of the auger 20 may be mechanically coupled to the speed drive of the feed rolls 51, meaning that the rotational speed of the auger 20, in either the forward or reverse direction, is always equal to or equal to a fixed ratio of the feed roll speed. In this case there is no actual, e.g. electronic link between the control unit 46 and the auger's speed drive. The control unit 46 still controls the auger speed, as symbolized by the dotted line in FIGS. 2*a* and 2*b*, but this control is done through the control of the feed roll speed. Alternatively, the auger's speed drive may be configured to drive the auger 20 at a speed that is independent of the feed roll speed, in which case the control unit 46 is effectively configured to control the forward and reverse rotation of the auger independently from the rotation of the feed rolls 51. Either the mechanical coupling of the auger to the feed rolls or the independent speed control are technologies which are known as such and which can be applied according to known practice in a harvester/header combination according to the invention.

During normal harvesting, the windguard roll 15 is in a low position, as shown in FIG. 2*a*, or possibly somewhat higher, depending on the amount of crops that is being collected. The actuators 18 can actively control this position, or they can be made inactive to allow the weight of the windguard roll 15 to press on the incoming crops. Meanwhile, the actuators 19 are in the inactive position equally shown in FIG. 2*a*, i.e. they do not interact with the support arms 21, leaving these arms 21 and thereby the auger 20 itself to be pivotable about axis 22 depending on the amount of incoming crops supplied by the reel 13.

Foreign objects such as stones and metal objects of medium weight are liable to get picked up by the tines 14 of the reel 13 along with a quantity of crops, and transported to the auger 20 and on to the feed rolls 51 of the harvester 1. As stated above, the harvester is equipped with a detector 45 configured to send a signal to the control unit 46, which reacts by timely stopping the feed rolls 51 when a foreign object is detected. When the feed rolls stop, the object is situated immediately upstream of the feed rolls 51, together with a quantity of crops accumulated at this location. In a harvester according to the invention, the rotating components of the header 2, in particular the auger 20, the reel 13 and the windguard roll 15, are preferably stopped simultaneously with the feed rolls 51. Alternatively, there may be time difference between stopping the feed rolls and the other rotating components or the other components may be stopped manually by the driver. As in the harvester described in WO2015/091567, when all the rotating elements have come to a stop, the driver may initiate a sequence of actions for ejecting the quantity of crops and the foreign object. The sequence applied according to the invention is different and represents an improvement with respect to existing object removal approaches. The sequence is executed through command signals generated by the control unit 46.

When applying the header 2 shown in FIGS. 2*a* and 2*b*, the first step of the sequence is the raising of the windguard roll 15 and of the auger 20, preferably to their highest possible positions, as illustrated in FIG. 2*b*, by activating the actuators 18 and 19. In the embodiment shown, the auger 20 is raised until the arms 21 are in contact with the upper stops 23. Raising the windguard roll 15 and raising the auger 20 may take place simultaneously or one after the other. Possibly already while the auger 20 is being raised and certainly for a given time thereafter while the auger is in the high position, the auger 20 and the feed rolls 51 are actively rotated in the reverse rotational direction. Preferably the reverse rotations of the feed rolls 51 and of the auger 20 are initiated at the same time, although a brief time lapse between the start of the reverse rotation of the feed rolls 51 and the auger 20 is not prohibited. The speeds at which the feed rolls 51 and the auger 20 are rotating in the reverse direction are compatible with each other and suitable for removing crops. These speeds are known from prior applications where a reverse rotation of these components is applied.

Simultaneously with the raising of the auger 20 or thereafter, the reel 13 is decoupled from its speed drive, so as to be freely rotatable about its central axis 52. The reverse rotation of the auger 20 pushes the majority of the quantity of crops accumulated upstream of the feed rolls 51 in the direction of the reel 13. The crops thereby push against the tines 14, making the freely rotatable reel 13 rotate in the reverse direction, so that the crops are ejected. Because the foreign object has been caught immediately upstream of the feed rolls 51, it is likely that this object is not ejected together with the crops, but remains on the floor 29 of the header frame 10. In order to finally remove the object, the auger 20 is now brought down by the actuators 19, preferably to its lowest possible position, whilst rotating in the reverse direction. Now the auger 20 is capable of removing any remaining crops and the object from the floor 29 of the header frame 10. This is followed by the active rotation of the reel 13 in the reverse direction at a suitable speed, enabling the effective ejection of any remaining crops and of the object from the header 2.

Generally and not only with respect to the embodiment of FIGS. 2*a* and 2*b*, the sequence can be summarized as follows, comprising 5 steps:

1. raising the auger 20 and the windguard roll 15,
2. decoupling the reel 13 from the reel speed drive so that the reel is freely rotatable. This step could take place simultaneously with or even before step 1 (i.e. order of steps 1 and 2 could be reversed)
3. rotating the auger 20 and the feed rolls 51 in the reverse direction while the auger is in the raised position, to remove crops from an area upstream of the feed rolls,
4. thereafter, lowering the auger 20 and maintaining the auger in a low position while it continues to rotate in the reverse direction, to thereby move the foreign object towards the reel,
5. thereafter, actively driving the reel 13 in the reverse direction, to thereby eject the crops and the foreign object.

The term 'sequence' and the numbering of 1 to 5 are not intended to signify that every step needs to be completed before the next step initiates. The order of the steps is not determined unless explicitly stated. Step 1 comprises two actions which, as already stated, can be performed simultaneously or one after the other. In step 3, the reverse rotation of the feed rolls and the auger preferably starts at the same time unless the two are mechanically coupled, which necessitates the simultaneous rotation of the feed rolls and the auger. The reverse rotation of the feed rolls and the auger may be initiated already before raising the auger and the windguard roll. Reverse rotation of the auger in the raised position preferably takes place during a given number of revolutions of the auger, for example between 1 and 5 revolutions. In step 4, the auger preferably stays in the low position also during a number of auger revolutions, which may be equal to the number of revolutions applied in the raised position. Step 5 is initiated preferably after the auger has been in the low position for a given time, for example after the auger has been in the low position for about 3-4 s. During this timespan, the auger 20 continues to rotate in the reverse direction.

The sequence can be activated by the driver of the harvester, possibly by pushing a button or an equivalent interface means to thereby send a command signal to the control unit 46, upon which the sequence is executed automatically by the control unit, applying pre-programmed starting points and timespans or predefined numbers of auger revolutions. The execution of the sequence may require the driver to continually activate the interface means (for example keep the button pressed), so that the sequence is interrupted when the interface means is released. Alternatively, the driver could have access to separate interface means to manually perform the consecutive steps.

After completing the sequence, the windguard roll 15 is lowered and the auger 20 and the reel 13 are again coupled to their respective speed drives for rotation in the forward direction, upon which normal harvesting can resume. These actions for re-starting the normal operation, in particular lowering the windguard roll(s) 15 are preferably not done in an automatically applied sequence, but by manual commands given by the driver of the harvester.

By the consecutive steps of raising the reverse-rotating auger 20 for removing the majority of the accumulated crops, and lowering the reverse-rotating auger, a more reliable removal of foreign objects is realised. The raised reverse-rotating auger 20 removes a majority of the accumulated crops during step 3, leaving the object along with fewer crops on the floor 29 of the header frame 10. Consequently, when the reverse-rotating auger is again lowered in step 4, the auger flights 26 are virtually certain to sweep the object outward from the header frame 10 towards the reel 13. The invention thereby enables the quasi-certain removal of foreign objects, avoiding a repeated stoppage of the feed rolls 51, and improving the efficiency of the harvesting operation.

Figure 3A:
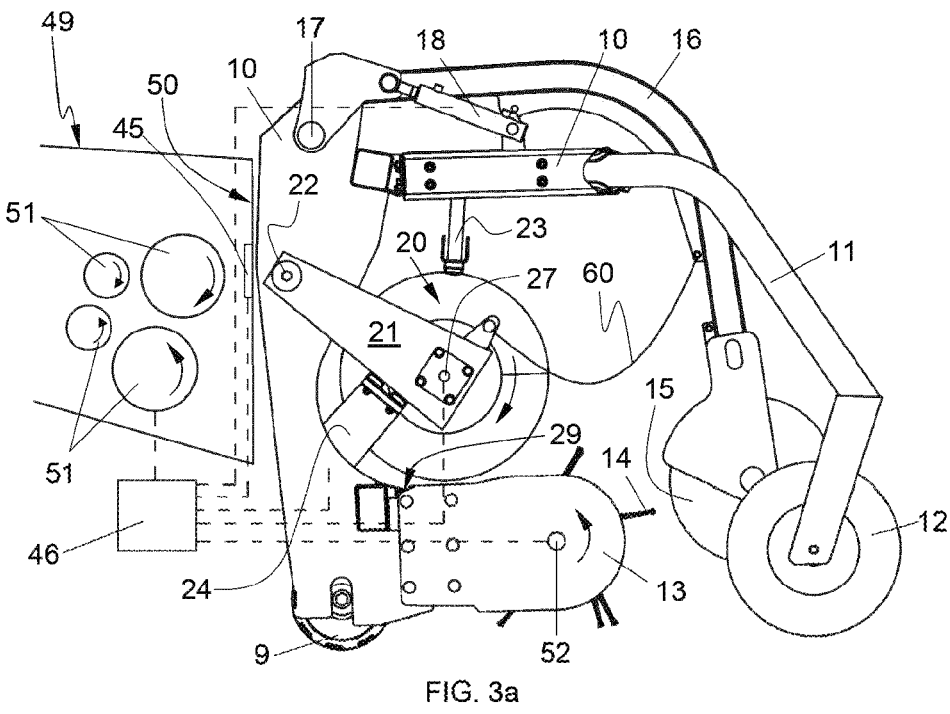
FIGS. 3a and 3b show side views of a pick-up header in a harvester/header combination according to a second embodiment of the invention, wherein the auger is coupled to the windguard rolls by a set of linkages.
Figure 3B:
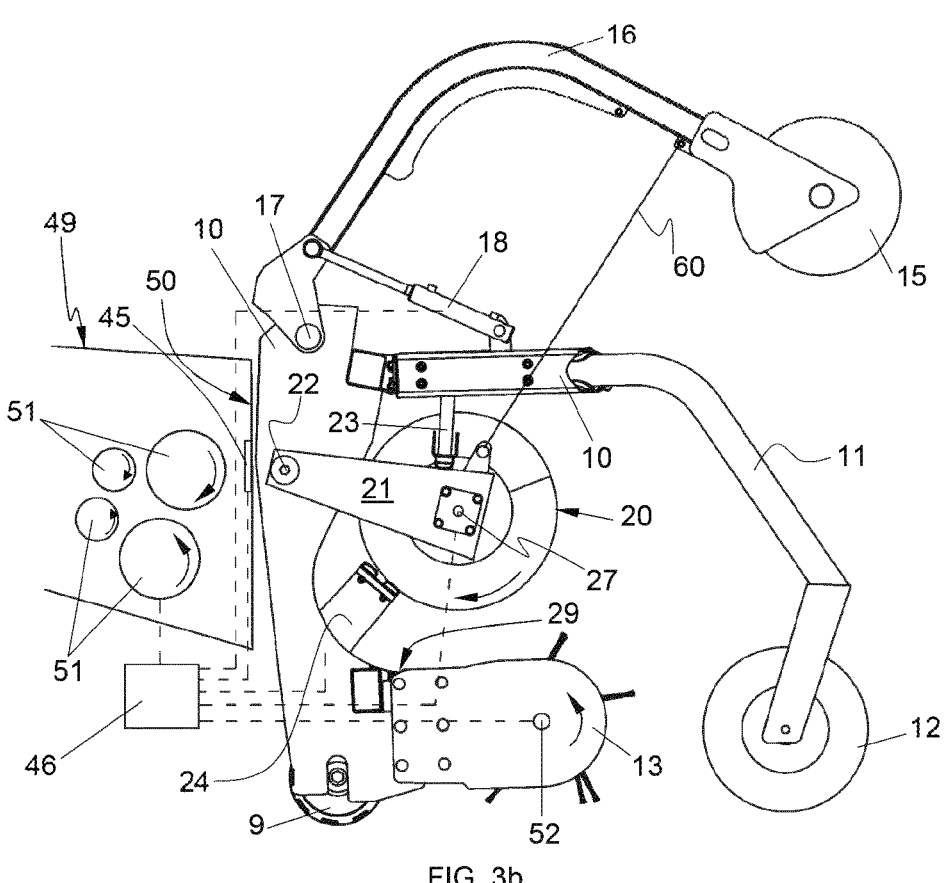

FIGS. 3a and 3b illustrate a second embodiment of a harvester/crop pick-up header combination according to the invention. According to this embodiment, the auger support arms 21 are coupled to the windguard support arms 16 by respective linkages 60 (only one of these is visible in the side view). These linkages can be chains or steel chords for example. When the windguard support arms 16 are raised, by activating the actuators 18, the auger 20 is pulled upwards via the linkages 60, as illustrated in FIG. 3b. In the embodiment shown, the length of the linkages 60 is such that the windguard arms 16 are raised up to a given level before these arms pull up the auger 20, from the moment that the linkages 60 are extended to their full length. In the opposite direction, the auger 20 reaches its lowest position before the windguard roll 15 reaches its own lowest position. The length of the linkages 60 thereby determines the timing of the upward and downward movements of the windguard roll 15 and the auger 20. For a given extension speed of the actuators 18, this timing is fixed, whereas in the embodiment of FIGS. 2a and 2b, the raising and lowering of the windguard roll 15 and of the auger 20 can be regulated independently from each other. Apart from this difference, the object removal sequence in accordance with the invention can be performed and controlled by the control unit 46, in the same manner as described with respect to the first embodiment.

Figure 4A:
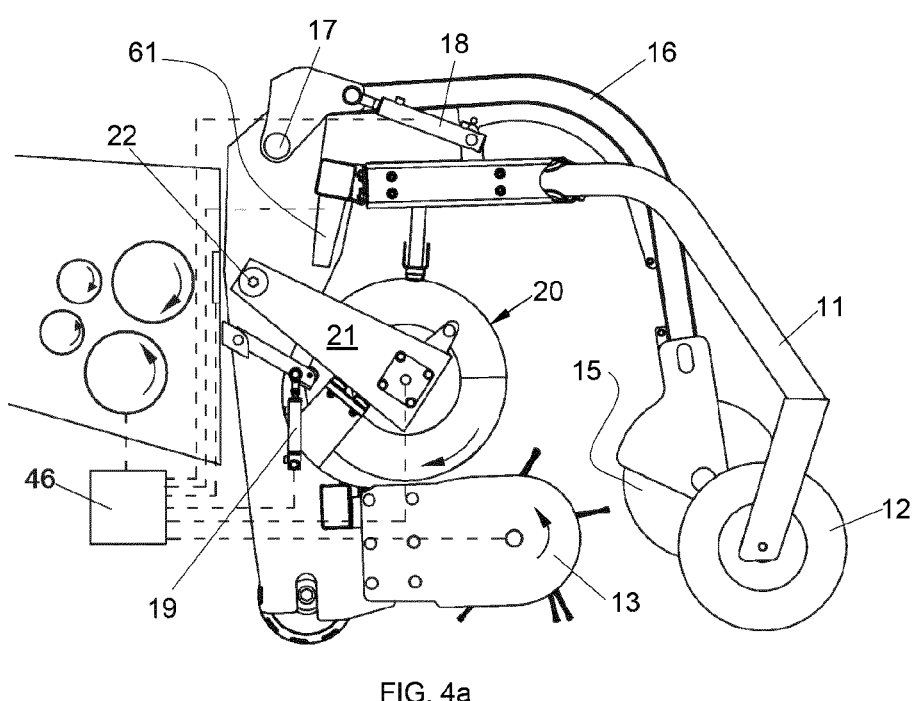
FIGS. 4a and 4b illustrate an embodiment further provided with a sensor that allows to determine the height position of the auger.
Figure 4B:
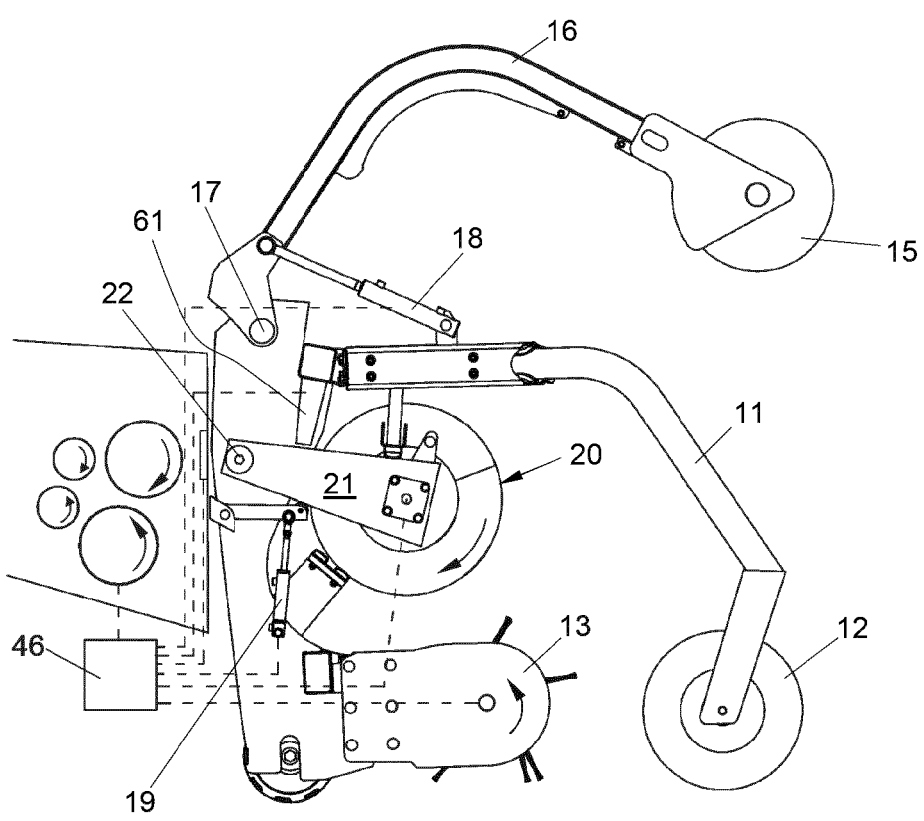

FIGS. 4a and 4b illustrate a third embodiment that may be combined with either one of the first and second embodiments. According to this third embodiment, the header 2 further comprises at least one sensor that may be used to determine the height position of the auger 20 (i.e. its distance to the floor portion 29 of the header frame 10) and/or the height position of the windguard roll (or rolls) 15 during the object removal sequence. A sensor for measuring the auger height may for example be an angle sensor that is mounted on the rotation axle of one of the arms 21, for example a potentiometer angle sensor, as well-known in the art and which indicates the angular position of the arms 21 about axis 22, from which the auger's height position may be derived. An alternative could be an optical position sensor attached to the frame 10 of the header 2 and arranged to measure the distance of one of the support arms 21 to the sensor. The sensor produces a signal that enables to determine the height position of the auger 20 relative to the floor 29 of the header. The latter type of sensor, i.e. an optical sensor 61 mounted on the frame 10, and configured to measure the distance to one of the arms 21, is illustrated in FIGS. 4a and 4b, which represent the embodiment of FIG. 2a, with the sensor 61 added. Two sensors 61 of the same type could be mounted in relation respectively to each of the support arms 21, with the height position of the auger calculated as an average of the measured or derived values. An additional sensor (not shown) or pair of sensors could be provided to measure the height position of the windguard roll 15. This can be an angle sensor measuring the angular position of the support arms 16 about rotation axis 17, or an optical sensor mounted on the frame 10 and measuring a distance to one of the arms 16.

In the embodiment of FIGS. 3a and 3b, the same sensors for measuring the position of the auger 20 and/or the windguard roll 15 can be included. Alternatively, and still in the context of this embodiment of FIGS. 3a and 3b, only a sensor (or a pair of sensors) could be applied for measuring the windguard roll position, and the auger position can be derived from this position, taking into account the known length of the linkages 60.

The sensor 61, and (if present) any of the other sensors described above, are connected to the control unit 46 as indicated by the dotted line between sensor 61 and the control unit 46 in FIGS. 4a and 4b. The signal acquired from the sensor(s) is processed in the control unit 46 and allows tracking the height of the auger 20 and/or the windguard roll or rolls 15 during the object removal sequence described above. This allows to make changes to the sequence in terms of the height levels applied in the 'low' and 'high' position for example, or it may be used to show the real-time height position of the auger 20 and/or the windguard roll 15 during the sequence, allowing the driver to initiate the various steps at any given position of the auger or the windguard roll.

The sequence of steps as described above represents the steps of the method according to the invention. All details described above with respect to the sequence are relevant as characteristics of the method.

In any embodiment of a harvester/header combination according to the invention, the control unit 46 may be located in the harvester 1 or in the header 2. When the unit 46 is located in the header 2, it is configured to connect to the feed rolls 51 of the harvester, and preferably to another control unit located in the harvester that is configured to control other functions of the harvester as such. It is also possible that the control unit 46 is physically realized as two interconnected control units, one located in the harvester and the other in the header.

A specific embodiment is now described, in which an additional action is taken, applicable regardless of whether a harvester/header combination is applied according to the first, second or third embodiment or any other embodiment of the invention. According to this specific embodiment, the harvester/header combination comprises a GPS device or equivalent global positioning device and an electronic memory or a means to connect to a cloud-type storage, or both. The control unit 46 is configured to store in said memory and/or in said cloud-type data storage the global coordinates of the location where a foreign object was detected and/or the location where the object was ejected. These data can be applied in a software applicable in subsequent harvesting runs, for example to warn a driver about the presence of foreign objects on a trajectory, or as a guide towards the removal of specific objects prior to a harvesting run.

The invention claimed is:

1. A harvester apparatus comprising:
   a harvester having an inlet and a set of forward and reverse-rotatable feed rolls positioned downstream of the inlet;
   a crop pick-up header that is operationally coupled to the harvester, the crop pick-up header comprising:
      a frame comprising a floor portion,
      a rotatable reel,
      a rotatable auger configured to receive crops which have been picked up by the rotatable reel, the rotatable auger comprising flights for moving the received crops towards a central area of the crop pick-up header and from there to the inlet of the harvester, wherein the rotatable auger is mounted between two auger support arms which are pivotable relative to the frame, about a common axis that is essentially parallel to the central rotation axis of the rotatable auger, so that the pivoting of the two auger support arms upward or downward causes raising or lowering of the rotatable auger relative to the floor portion of the frame,
      one or more rotatable windguard rolls movable between a low position for maintaining collected crops on a transfer path from the rotatable reel towards the rotatable auger, and a high position wherein the one or more rotatable windguard rolls are removed from said transfer path, and
      one or more actuators for actively pivoting the two auger support arms and thereby the rotatable auger about said common axis, to thereby actively raise or lower the rotatable auger;
   an auger speed drive that is configured to reverse rotational direction of the rotatable auger from a forward direction applied during the collection of crops to a reverse direction;
   a reel speed drive configured to reverse rotational direction of the rotatable reel from a forward direction applied during the collection of crops to a reverse direction;
   a detection system configured to detect a foreign object before it enters into the inlet of the harvester, and to stop the feed rolls upon said detection;
   a control unit configured to perform the following steps when the foreign object has been detected and after stopping the feed rolls:
      raising the rotatable auger and the one or more rotatable windguard rolls,
      decoupling the rotatable reel from the reel speed drive so that the rotatable reel is freely rotatable, rotating the rotatable auger and the feed rolls in the reverse direction while the rotatable auger is in a raised position, to remove crops from an area upstream of the feed rolls,
      thereafter, lowering the rotatable auger to a lower position and maintaining the rotatable auger in said lower position, while continuing to drive the rotation of the rotatable auger in the reverse direction, to thereby move the foreign object towards the rotatable reel,
      actively driving the rotatable reel in the reverse direction after the rotatable auger has reached the lower position, to thereby eject the crops and the foreign object from the crop pick-up header.

2. The apparatus of claim 1, wherein the crop pick-up header comprises a first set of actuators for raising or lowering the one or more rotatable windguard rolls, and a second set of actuators for raising or lowering the two auger support arms of the rotatable auger and thereby the rotatable auger itself.

3. The apparatus of claim 2, wherein the control unit is configured to separately control the operation of the first and second set of actuators.

4. The apparatus of claim 1, wherein the crop pick-up header further comprises a set of actuators for raising or lowering the one or more rotatable windguard rolls, the one or more rotatable windguard rolls supported between ends of a first and a second windguard support arm, wherein the set of actuators is coupled between the frame and the first and second windguard support arms, and wherein a set of linkages is present between the first and second windguard support arms and the respective two auger support arms, such that raising or lowering the first and second windguard support arms causes raising or lowering of the two auger support arms and thereby of the rotatable auger.

5. The apparatus of claim 1, wherein the crop pick-up header further comprises at least one sensor configured to determine a height position of at least one of the rotatable auger or the one or more rotatable windguard rolls relative to the floor portion, or a parameter representative thereof, wherein the at least one sensor is connected to the control unit such that said height position can be measured during the steps after stopping the feed rolls.

6. The apparatus of claim 1, further comprising:
   a global positioning device configured to detect a location of at least one of the harvester or the crop pick-up header; and
   a memory accessible to the control unit;
   wherein the control unit is configured to store in said memory the location of the at least one of the harvester or the crop pick-up header at which the foreign object is at least one of detected or ejected.

7. A header system for use with a harvester having an inlet, the system comprising:
   a crop pick-up header comprising:
      a frame comprising a floor portion,
      a rotatable reel,
      a rotatable auger configured to receive crops which have been picked up by the rotatable reel, the rotatable auger comprising flights for moving the received crops towards a central area of the crop pick-up header and from there to the inlet of the harvester, wherein the rotatable auger is mounted between two auger support arms which are pivotable relative to the frame, about a common axis that is essentially parallel to the central rotation axis of the rotatable auger, so that the pivoting of the two auger support arms upward or downward causes raising or lowering of the rotatable auger relative to the floor portion of the frame, one or more rotatable windguard rolls movable between a low position for maintaining collected crops on a transfer path from the rotatable reel towards the rotatable auger, and a high position wherein the one or more rotatable windguard rolls are removed from said transfer path, one or more actuators for actively pivoting the two auger support arms and thereby the rotatable auger about said common axis, to thereby actively raise or lower the rotatable auger; and a control unit coupled to the crop pick-up header and configured to detect a foreign object before it enters into the inlet of the harvester, to raise the rotatable auger and the one or more rotatable windguard rolls, decouple the rotatable reel from a reel speed drive so that the rotatable reel is freely rotatable, rotate the rotatable auger in reverse while the rotatable auger is in a raised position, remove crops from an area upstream of feed rolls of the harvester, thereafter, lower the rotatable auger to a lower position and maintain the rotatable auger in said lower position, while continuing to drive the rotation of the rotatable auger in a reverse direction, to thereby move the foreign object towards the rotatable reel, and after the rotatable auger has reached the lower position, actively drive the rotatable reel in the reverse direction, to thereby eject the foreign object from the crop pick-up header.

8. The system of claim 7, wherein the crop pick-up header comprises the control unit.

9. The system of claim 7, wherein the crop pick-up header comprises a first set of actuators for raising or lowering the one or more rotatable windguard rolls, and a second set of actuators for raising or lowering the two auger support arms of the rotatable auger and thereby the rotatable auger itself.

10. The system of claim 9, wherein the control unit is configured to separately control operation of the first and second set of actuators.

11. The system of claim 7, wherein the crop pick-up header comprises a set of actuators for raising or lowering the one or more rotatable windguard rolls, the one or more rotatable windguard rolls being supported between ends of a first and a second windguard support arm, wherein the set of actuators is coupled between the frame and the first and second windguard support arms, and wherein a set of linkages is present between the first and second windguard support arms and the respective two auger support arms, so that raising or lowering the first and second windguard support arms causes raising or lowering of the two auger support arms and thereby of the rotatable auger.

12. The system of claim 7, wherein the crop pick-up header further comprises at least one sensor configured to determine a height position of at least one of the rotatable auger or the one or more rotatable windguard rolls relative to the floor portion, or a parameter representative thereof, wherein the at least one sensor is connected to the control unit such that said height position can be measured after stopping the feed rolls.

13. The system of claim 7, further comprising:

a global positioning device configured to detect a location of at least one of the harvester or the crop pick-up header; and a memory accessible to the control unit;

wherein the control unit is configured to store in said memory the location of the at least one of the harvester or the crop pick-up header at which the foreign object is at least one of detected or ejected.

14. A method for removing a foreign object from a crop pick-up header that is operationally coupled to a harvester, the harvester comprising an inlet and a set of forward and reverse-rotatable feed rolls positioned downstream of the inlet, the crop pick-up header comprising a frame having a floor portion, a rotatable reel, a rotatable auger configured to receive crops which have been picked up by the rotatable reel, the rotatable auger comprising flights for moving the received crops towards a central area of the crop pick-up header and from there to the inlet of the harvester, wherein the rotatable auger is mounted between two auger support arms which are pivotable relative to the frame, about a common axis that is essentially parallel to the central rotation axis of the rotatable auger, such that pivoting the two auger support arms upward or downward causes raising or lowering of the rotatable auger relative to the floor portion of the frame, one or more rotatable windguard rolls movable between a low position for maintaining collected crops on a transfer path from the rotatable reel towards the rotatable auger, and a high position wherein the one or more rotatable windguard rolls are removed from said transfer path, a combination of the harvester and the crop pick-up header comprising an auger speed drive that is configured to reverse rotational direction of the rotatable auger from a forward direction applied during the collection of crops to a reverse direction, a reel speed drive that is configured to reverse rotational direction of the rotatable reel from a forward direction applied during the collection of crops to a reverse direction, a detection system configured to detect a foreign object before it enters into the inlet of the harvester, and to stop the feed rolls upon said detection, one or more actuators for actively pivoting the two auger support arms and thereby the rotatable auger about said common axis, to thereby actively raise or lower the rotatable auger, wherein the method comprises the following steps to remove the foreign object, performed after the detection of the foreign object and after stopping the feed rolls:

raising the rotatable auger and the one or more rotatable windguard rolls, decoupling the rotatable reel from the reel speed drive so that the rotatable reel is freely rotatable, rotating the rotatable auger and the feed rolls in the reverse direction while the rotatable auger is in a raised position, to remove crops from an area upstream of the feed rolls, thereafter, lowering the rotatable auger to a lower position and maintaining the rotatable auger in said lower position, while continuing to drive the rotation of the rotatable auger in the reverse direction, to thereby move the foreign object towards the rotatable reel, after the rotatable auger has reached the lower position, actively driving the rotatable reel in the reverse direction, to thereby eject the crops and the foreign object from the crop pick-up header.

15. The method according to claim 14, wherein raising or lowering of the one or more rotatable windguard rolls, and raising or lowering of the two auger support arms of the rotatable auger is performed by separate sets of actuators.

16. The method according to claim 14, wherein the crop pick-up header comprises a set of actuators for raising or lowering the one or more rotatable windguard rolls, the the one or more rotatable windguard rolls being supported between ends of a first and a second windguard support arm wherein the set of actuators is coupled between the frame and the first and second windguard support arms, and wherein a set of linkages is present between the first and second windguard support arms and the respective two auger support arms, so that raising or lowering the first and second windguard support arms causes raising or lowering of the two auger support arms and thereby of the rotatable auger.

17. The method according to claim 14, wherein the crop pick-up header further comprises at least one sensor configured to determine a height position of at least one of the rotatable auger or the one or more rotatable windguard rolls relative to the floor portion, or a parameter representative thereof, wherein the at least one sensor is connected to a control unit and wherein said height position is measured during the steps to remove the foreign object.

18. The method according to claim 14, wherein at least one of the crop pick-up header or the harvester comprises a global positioning system configured to determine a location of at least one of the harvester or the crop pick-up header and wherein the method further comprises:

storing in a memory accessible to a control unit the location of the at least one of the harvester or the crop pick-up header at which the foreign object is at least one of found or ejected.

\* \* \* \* \*